United States Patent
Kokubu et al.

(10) Patent No.: US 6,260,651 B1
(45) Date of Patent: Jul. 17, 2001

(54) KEYLESS VEHICLE STARTER CONTROL DEVICE

(75) Inventors: Sadao Kokubu; Takashi Mizuno, both of Aichi-ken (JP)

(73) Assignee: Kabushiki Kaisha Tokai Rika Denki Seisakusho, Aichi-Ken (JP)

( * ) Notice: Subject to any disclaimer, the term of this patent is extended or adjusted under 35 U.S.C. 154(b) by 0 days.

(21) Appl. No.: 09/536,422

(22) Filed: Mar. 28, 2000

Related U.S. Application Data

(63) Continuation of application No. PCT/JP98/02186, filed on May 18, 1998, now abandoned.

(30) Foreign Application Priority Data

May 19, 1997 (JP) .................................................... 9-128474

(51) Int. Cl.[7] ............................. B60R 25/02; B60R 25/04
(52) U.S. Cl. ............................. 180/287; 307/10.5; 70/252
(58) Field of Search ........................... 180/287; 307/10.5, 307/10.3, 10.2; 70/252

(56) References Cited

U.S. PATENT DOCUMENTS

| | | | |
|---|---|---|---|
| 5,036,687 | * 8/1991 | Takeuchi et al. | 70/252 |
| 5,157,389 | * 10/1992 | Kurozu et al. | 307/10.2 |
| 5,656,867 | * 8/1997 | Kokubu | 180/287 |
| 5,801,614 | * 9/1998 | Kokubu | 180/287 |
| 5,965,955 | * 10/1999 | Takanohashi | 307/10.5 |
| 6,011,320 | * 1/2000 | Miyamoto et al. | 180/287 |

FOREIGN PATENT DOCUMENTS

| | | |
|---|---|---|
| 1-147765 | 10/1989 | (JP) . |
| 8-282440 | 10/1996 | (JP) . |
| 8-282441 | 10/1996 | (JP) . |
| 8-282442 | 10/1996 | (JP) . |

* cited by examiner

Primary Examiner—Peter C. English
(74) Attorney, Agent, or Firm—Akin, Gump, Strauss, Hauer & Feld, L.L.P.

(57) ABSTRACT

The present invention simplifies assembly of a vehicle starting device and facilitates arrangement design. A vehicle starting device 3 has a card receiving portion 4 and a main mechanism 5 connected with each other integrally. The card receiving portion 4 includes an inclinable inner case 7 in which an integrated circuit (IC) card is inserted. The card receiving portion 4 also includes a roller 9 and a release mechanism 16 for releasing the IC card. The roller 9 is lifted by the insertion of the IC card. The release mechanism 16 releases the IC card from the card receiving portion 4. The main mechanism 5 has a knob 23 and a steering shaft lock 33. A card release prevention mechanism 24, an ejector lever 25 for actuating the release mechanism 16, and a cooperative unlocking mechanism 30 are provided between the main mechanism 5 and the card receiving portion 4.

3 Claims, 16 Drawing Sheets

(a) (b)

(a) (b)

(a) (b)

(a)　　　　　　　　　　(b)

(a)　　　　　　　　　　(b)

(Shift Lever In "P" Range)   (Shift Lever Not In "P" Range)

(a)

(b)

(Shift Lever In "P" Range)   (Shift Lever Not In "P" Range)

(a)   (b)

PRIOR ART

KEYLESS VEHICLE STARTER CONTROL DEVICE

CROSS-REFERENCE TO RELATED APPLICATION

This application is a continuation of International Application PCT/JP98/02186 filed May 18, 1998, now abandoned, the disclosure of which is incorporated herein by reference.

BACKGROUND OF THE INVENTION

1. Technical Field

The present invention relates to vehicle starting devices having IC cards.

2. Background Art

In recent years, there has been a demand for improved vehicle security. In particular, various types of security systems for preventing wrongful operation of ignition switches have been proposed.

A typical system has, for example, an integrated circuit (IC) card storing an identification (ID) code. The ID code is read by an IC card reader provided in a vehicle. If the ID code matches a code registered in the reader, operation of the ignition switch is validated to permit engine starting.

A prior art ignition switch has a key rotor rotated by a key. When the key rotor is rotated by the key to a "LOCK" position, which prohibits the vehicle from being driven, the steering shaft is mechanically locked, thus preventing the shaft from rotating. When the key rotor is rotated to a position that allows the vehicle to be driven ("ACC" position or "ON" position), the steering shaft is unlocked and allowed to rotate. Since the ID card system is configured simply to permit the engine to start if the ID code stored by the IC card matches the registered code, the security system cannot replace the ignition switch, which also functions as a steering shaft locking means.

Furthermore, the IC card system requires both the IC card and the ignition key, which is burdensome.

Accordingly, the present inventors considered an operating means, in lieu of the key, operable between a driving prohibition position and a driving permitting position, which includes the engine starting position. When the operating means is located at the driving prohibiting position, a steering shaft locking means locks the steering shaft in a rotation prohibition state. The operating means and the steering shaft locking means define a main mechanism, which is located at an instrument panel of the vehicle. Furthermore, the inventors considered a card receiving portion arranged in the instrument panel to receive the IC card. For example, as shown in FIG. 33, a main mechanism 92 having an operating member 91 is located on an instrument panel 93 beside a steering wheel 94, and a card receiving portion 95 is located on top of the instrument panel 93.

However, since the main mechanism 92 is separate from the card receiving portion 95, the main mechanism 92 and the card receiving portion 95 are not easy to handle and difficult to assemble. Further, it is difficult to design their arrangements.

SUMMARY OF THE INVENTION

Accordingly, it is an objective of the present invention to provide a vehicle starting device having improved vehicle security, requiring no keys, capable of permitting and prohibiting rotation of the steering shaft, simplifying assembly, and facilitating arrangement design of the starting device.

The invention of the first embodiment is a vehicle starting device for determining whether an ID code stored in an IC card matches a code registered in a vehicle, wherein the determination result is used as one of the conditions for permitting starting of the engine, the device comprising:

a card receiving portion for receiving the IC card; and a main mechanism having an operating means operable between a driving prohibiting position and a driving permitting position, which includes an engine starting position, and a steering shaft locking means for locking a steering shaft in a rotation prohibition state when the operating means is located at the driving prohibiting position, the device being characterized in that:

the card receiving portion and the main mechanism are connected with each other integrally;

a movable member that moves in accordance with the insertion of the IC card is arranged in the card receiving portion; and a cooperative unlocking mechanism cooperating with the movable member for cancelling the locking of the steering shaft locking means is located between the card receiving portion and the main mechanism.

In the above structure, it is determined whether the ID code stored in the IC card matches the code registered in the vehicle, and the determination result is used as one of the conditions for permitting starting of the engine. Thus, vehicle security is improved. Furthermore, a main mechanism has an operating means operable between a driving prohibiting position and a driving permitting position, which includes an engine starting position. Thus, the conventional key is not required. The main mechanism also has a steering shaft locking means for locking a steering shaft in a rotation prohibition state when the operating means is located at the driving prohibiting position. This prohibits and permits rotation of the steering shaft. Further, the card receiving portion and the main mechanism are connected with each other integrally. Thus, assembly is easy and arrangement design is simple.

Furthermore, since the card receiving portion and the main mechanism are formed integrally, various types of mechanical control mechanisms may be provided between the card receiving portion and the main mechanism. In particular, a movable member that moves in accordance with the insertion of the IC card is arranged in the card receiving portion, and a cooperative unlocking mechanism cooperating with the movable member for cancelling the locking of the steering shaft locking means is located between the card receiving portion and the main mechanism. Thus, the steering shaft is unlocked mechanically when the IC card is inserted.

The invention of the second embodiment is a vehicle starting device for determining whether an ID code stored in an IC card matches a code registered in a vehicle, wherein the determination result is used as one of the conditions for permitting starting of the engine, the device comprising:

a card receiving portion for receiving the IC card; and a main mechanism having an operating means operable between a driving prohibiting position and a driving permitting position, which includes an engine starting position, and a steering shaft locking means for locking a steering shaft in a rotation prohibition state when the operating means is located at the driving prohibiting position, the device being characterized in that:

the card receiving portion and the main mechanism are integrally connected with each other;

an inner case is arranged in the card receiving portion to receive the inserted IC card, the inner case being movable relative to a card slot of the card receiving portion;

a movable member that moves in accordance with the insertion of the IC card is provided in the card receiving portion; and a cooperative unlocking mechanism, which is located between the card receiving portion and the main mechanism, cooperates with the movable member for moving the inner case relative to the card slot.

In the above structure, it is determined whether the ID code stored in the IC card matches the code registered in the vehicle, and the determination result is used as one of the conditions for permitting starting of the engine. Thus, vehicle security is improved. Furthermore, a main mechanism has an operating means operable between a driving prohibiting position and a driving permitting position, which includes an engine starting position. Thus, a conventional key is not required. The main mechanism also has a steering shaft locking means for locking a steering shaft in a rotation prohibition state when the operating means is located at the driving prohibiting position. This prohibits and permits rotation of the steering shaft. Further, the card receiving portion and the main mechanism are integrally connected with each other. Thus, assembly is easy and the arrangement is simple.

Furthermore, since the card receiving portion and the main mechanism are integral, various types of mechanical control mechanisms may be provided between the card receiving portion and the main mechanism. An inner case is arranged in the card receiving portion to receive the inserted IC card. The inner case is movable relative to a card slot of the card receiving portion. This prevents the IC card from being released from the card receiving portion in accordance with the operation of the operating member.

The invention of the third embodiment is a vehicle starting device for determining whether an ID code stored in an IC card matches a code registered in a vehicle, wherein the determination result is used as one of the conditions for permitting starting of the engine, the device comprising:

a card receiving portion for receiving the IC card; and a main mechanism having an operating means operable between a driving prohibiting position and a driving permitting position, which includes an engine starting position, and a steering shaft locking means for locking a steering shaft in a rotation prohibition state when the operating means is located at the driving prohibiting position, the device being characterized in that:

the card receiving portion and the main mechanism are integrally connected with each other;

a card release mechanism arranged in the card receiving portion for releasing the inserted card from the card receiving portion; and a card release control mechanism, which is located between the card receiving portion and the main mechanism, cooperates with the operating member to drive the card release mechanism.

In the above structure, it is determined whether the ID code stored in the IC card matches the code registered in the vehicle, and the determination result is used as one of the conditions for permitting starting of the engine. Thus, vehicle security is improved. Furthermore, a main mechanism has an operating means operable between a driving prohibiting position and a driving permitting position, which includes an engine starting position. Thus, a conventional key is not required. The main mechanism also has a steering shaft locking means for locking a steering shaft in a rotation prohibition state when the operating means is located at the driving prohibiting position. This prohibits and permits rotation of the steering shaft. Further, the card receiving portion and the main mechanism are integrally connected with each other. Thus, assembly is easy and the arrangement is simple.

Furthermore, since the card receiving portion and the main mechanism are formed integrally, various types of mechanical control mechanisms may be provided between the card receiving portion and the main mechanism. A card release mechanism is arranged in the card receiving portion for releasing the inserted card from the card receiving portion. A card release control mechanism, which is located between the card receiving portion and the main mechanism, cooperates with the operating member to drive the card release mechanism. Thus, the IC card can be released in relation with the operation of the operating member.

DETAILED DESCRIPTION OF THE INVENTION

Figure 1:
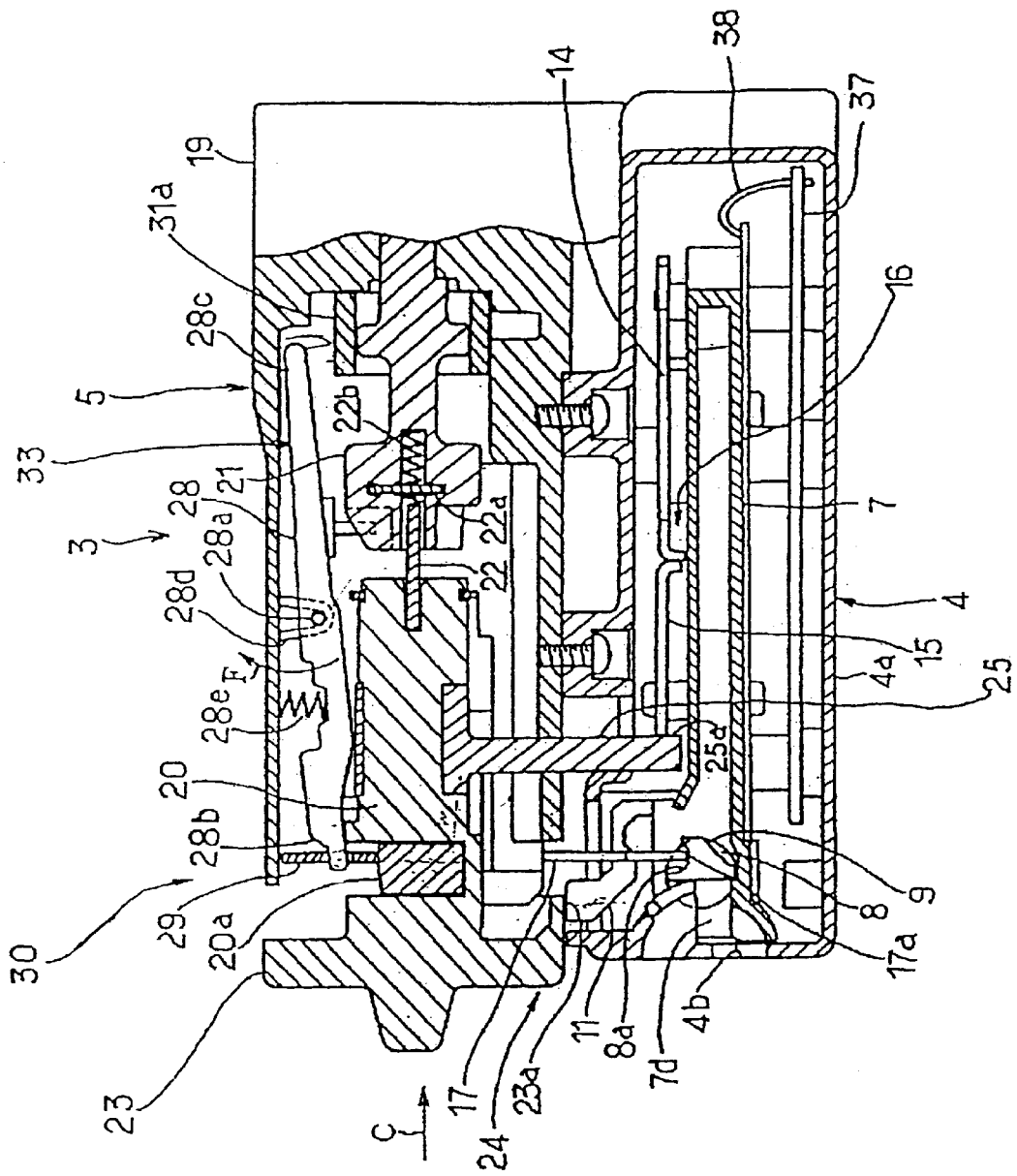
FIG. 1 is a vertical cross-sectional side view showing a device according to a first embodiment of the present invention.
Figure 2:
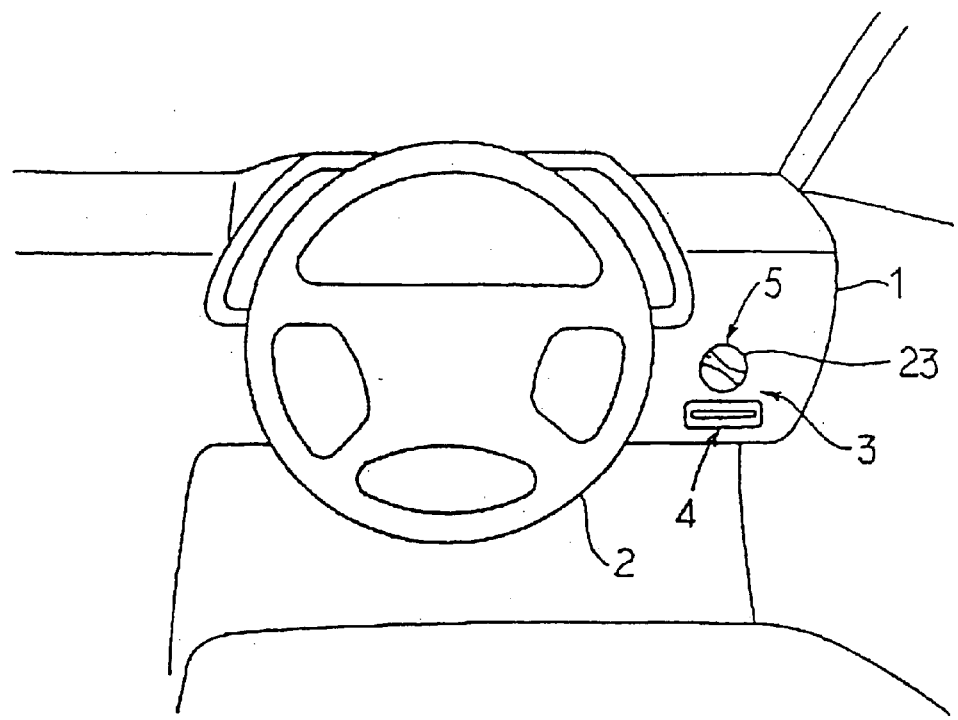
FIG. 2 is a front view showing an instrument panel on which the device of the present invention is installed.
Figure 3:
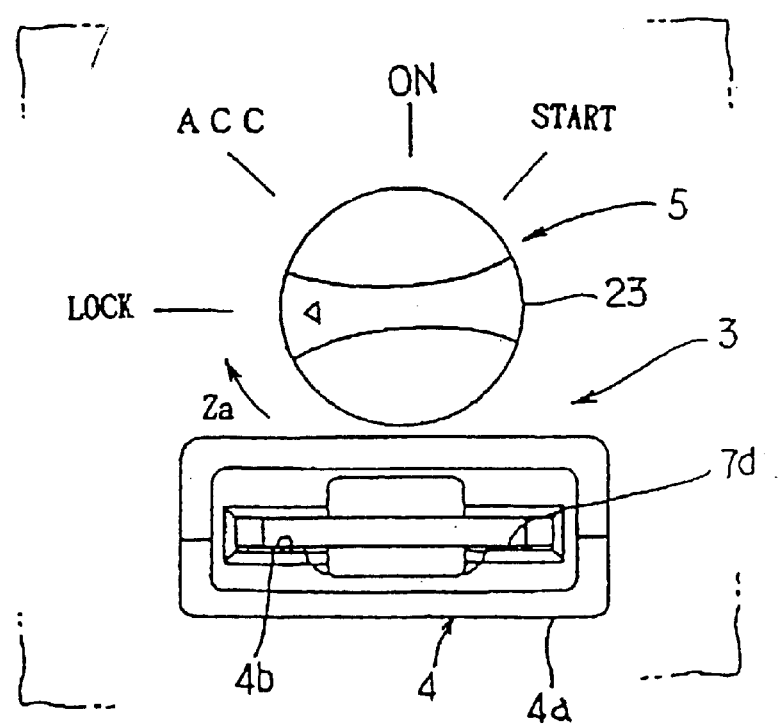
FIG. 3 is a front view showing the device of the present invention in an installed state.

A first embodiment of the present invention will now be described with reference to FIGS. 1 to 24. As shown in FIG. 2, a vehicle starting device 3 is arranged on a vehicle instrument panel 1 beside a steering wheel 2 of an instrument panel 1 of a vehicle. A knob 23 of the starting device 3 is rotated between a "LOCK" position, at which the vehicle is not permitted to be driven, as shown in FIG. 3, and "ACC," "ON," and "START" (engine starting) positions, at which the vehicle is permitted to be driven.

Figure 5:
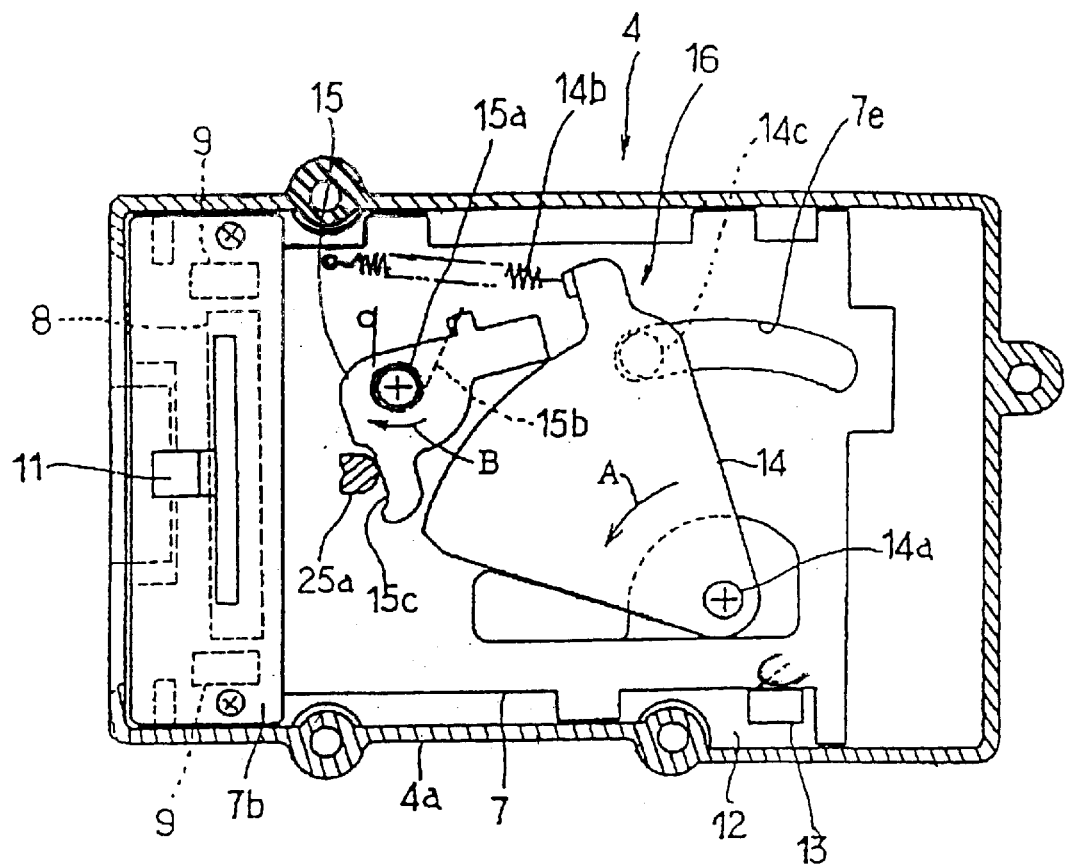
FIG. 5 is a horizontal cross-sectional plan view showing a card receiving portion.
Figure 6:
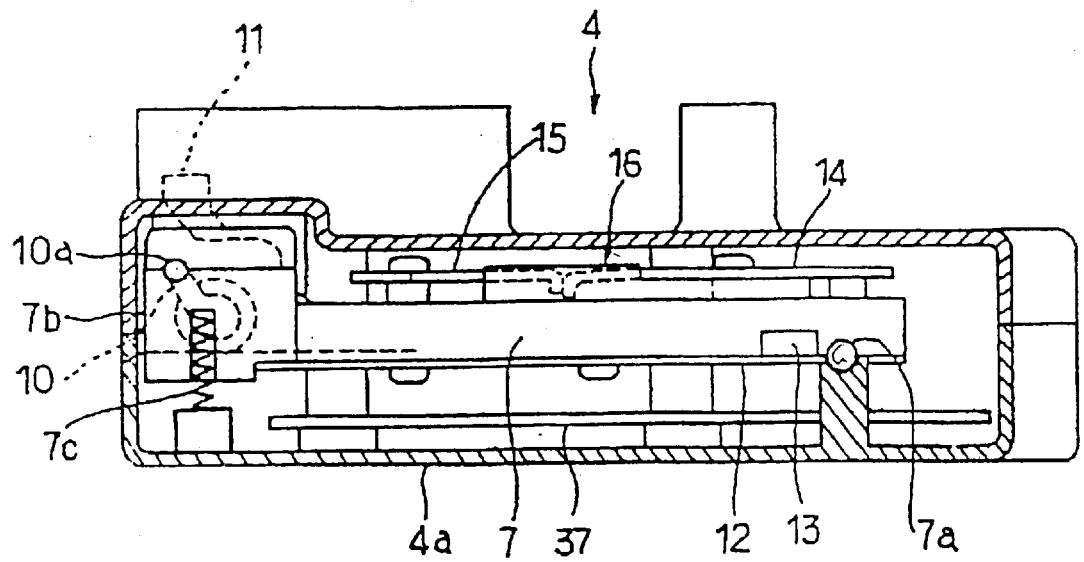
FIG. 6 is a vertical cross-sectional side view taken at a position differing from FIG. 1 and showing the card receiving portion.

The vehicle starting device 3 will now be described. As shown in FIGS. 1, 4, 5, and 6, the starting device 3 includes a card receiving portion 4 and a main mechanism 5. The card receiving portion 4 has a card case 4a. A card slot 4b, through which an IC card 6 (see FIG. 7) is received and discharged, is formed on the front of the card case 4a. An inner case 7 for accommodating the IC card 6 is provided behind the slot 4b. The inner case 7 pivots (moves) about a shaft 7a, as shown in FIG. 6. A shutter holder 7b located at the front of the inner case 7 includes a spring 7c, which normally maintains the inner case 7 in a substantially horizontal state. In this state, an entrance 7d of the inner case 7 opposes the card slot 4b.

The shutter holder 7b includes a shutter 8 and a shutter arm 10 having rollers 9 (corresponding to movable members). The shutter arm 10 pivots about a shaft 10a. The shutter holder 7b also has a push-down lever 11 projecting upward from the shutter holder 7b.

A circuit board 12 is arranged at the outer bottom surface of the inner case 7 and has a card switch 13, which functions as a card sensor. The card switch 13 has an actuator projecting into the inner case 7.

An ejector plate 14 is arranged on top of the inner case 7 and pivots about a shaft 14a. The ejector plate 14 is normally urged by a spring 14b in a direction indicated by arrow A. An operated pin 14c projects downward from the bottom surface of the ejector plate 14. The operated pin 14c extends into the interior of the inner case 7 through an arched opening 7e, which is formed in the upper wall of the inner case 7.

A stopper plate 15 is also located on top of the inner case 7 and pivots about a shaft 15a. A spring 15b normally urges the stopper plate 15 in the direction indicated by arrow B. The ejector plate 14 and the stopper plate 15 form a release mechanism 16.

Figure 4:
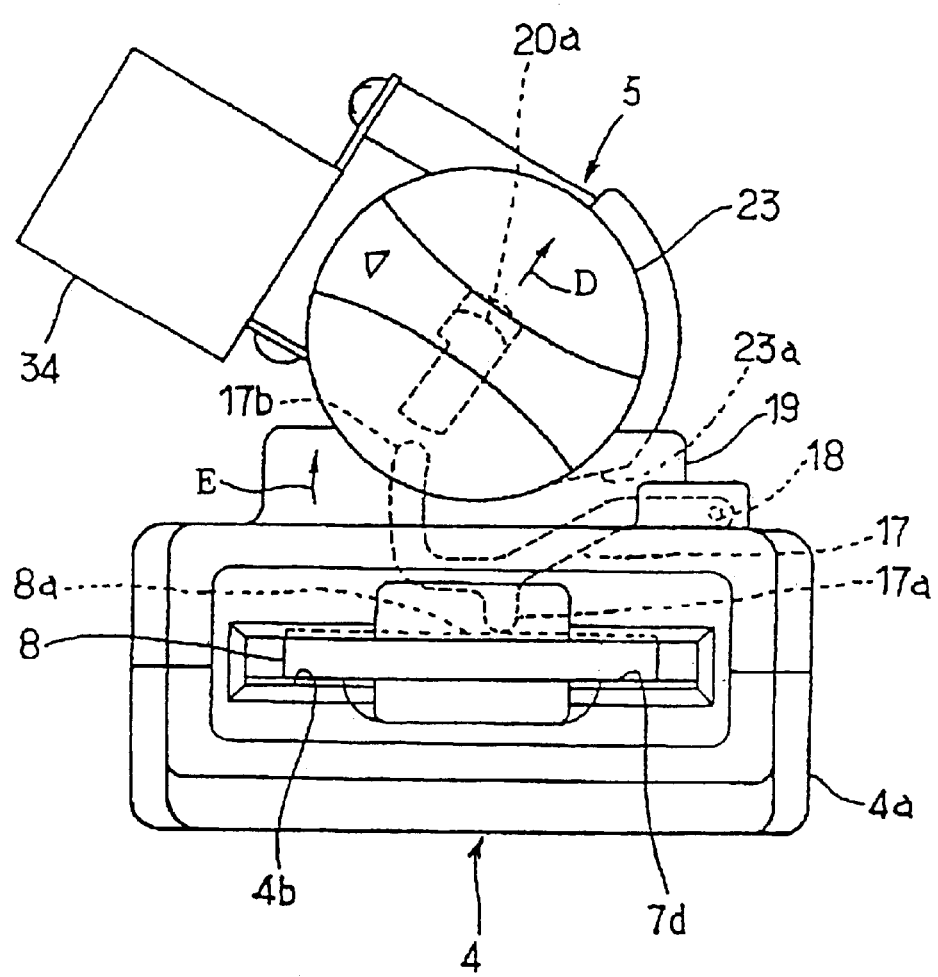
FIG. 4 is a front view showing the device of the present invention.

As shown in FIG. 4, a lever 17 is provided at the front of the card case 4a and pivots about a shaft 18. The lever 17 has an end 17a slidably contacting an arched surface 8a formed along the top surface of the shutter 8.

Figure 22:
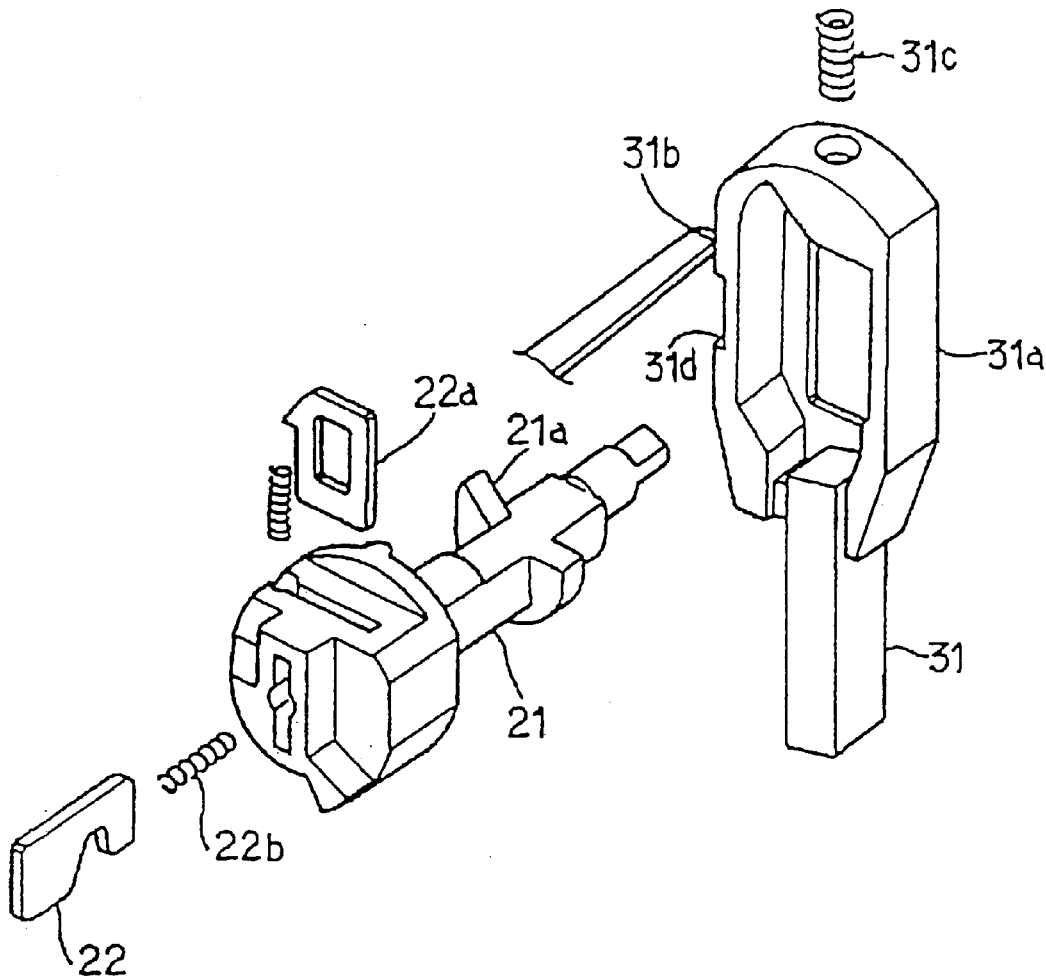
FIG. 22 is an exploded perspective view showing the camshaft and a locking bar.
Figure 23:
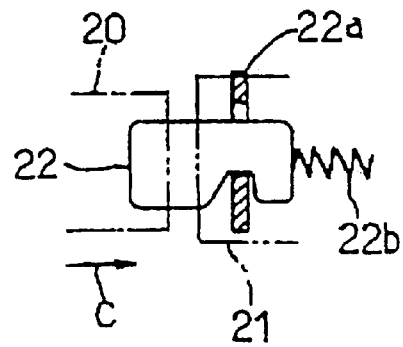
FIG. 23 is a schematic view showing a connecting plate in an assembled state.

A main mechanism 5 has a main mechanism case 19 fastened to the top surface of the card case 4a by screws. The card receiving portion 4 and the main mechanism 5 are thus coupled integrally. The main mechanism case 19 accommodates a rotor 20 and a camshaft 21 that are coaxially rotated. As shown in FIGS. 22 and 23, the rotor 20 and the camshaft 21 are connected to and rotated integrally with each other when a connecting plate 22 is engaged with an engaging plate 22a. The rotor 20 and the camshaft 21 thus rotate integrally. A spring 22b urges the connecting plate 22 in a direction opposite the direction indicated by arrow C to urge the rotor 20 in the same direction.

The knob 23, or operating member, is secured to the front of the rotor 20. The rotor 20 moves in the direction indicated by arrow C when the knob 23 is pressed. The spring 22b returns the rotor 20 in the opposite direction.

As shown in FIG. 4, a cam 23a is formed on the outer circumferential portion of the knob 23. The cam 23a slidably contacts the top surface of the push-down lever 11. The cam 23a and the push-down lever 11 form a card release prevention mechanism 24.

The rotor 20 has a slidable piece 20a slided in the direction indicated by arrow D and an opposite direction, as shown in FIG. 4. The slidable piece 20a slides in the direction of arrow D when the lever 17 is pivoted in the direction indicated by arrow E. As shown in FIG. 1, an ejector lever 25 extends downward from the rotor 20 and functions as a card release control mechanism. Furthermore, as shown in FIG. 5, the ejector lever 25 has a lower end 25a associated with an end 15c of the stopper lever 15.

Figure 16:
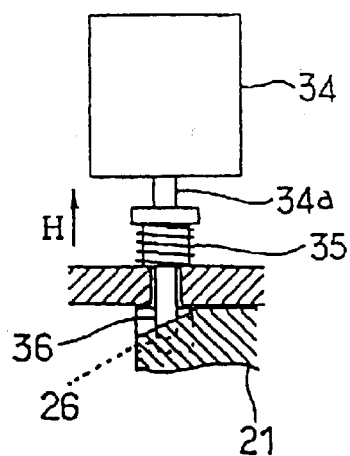
FIG. 16 is a horizontal cross-sectional view showing a solenoid, a pin, and a camshaft.
Figure 17:
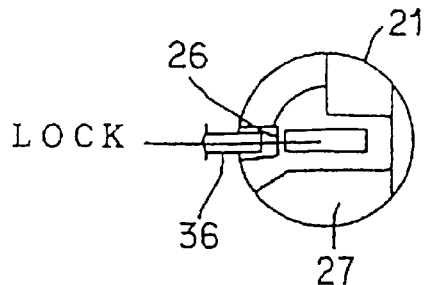
FIG. 17 is a schematic front view showing the relationship between the movement of the pin and the position of the camshaft.

As shown in FIGS. 16, 17, and 22, the camshaft 21 has an engaging recess 26 engaged with a pin 36. The pin 36 is actuated by a solenoid 34, which will be discussed later. The camshaft 21 also has a releasing recess 27 for releasing the pin 36. Furthermore, as shown in FIG. 22, the camshaft 21 includes a cam 21a.

As shown in FIG. 1, the main mechanism case 19 has a locking lever 28 pivoted about a shaft 28a. The locking lever 28 has an end 28b on which an operating plate 29 is vertically fitted. The operating plate 29 is opposed to the top portion of the slidable piece 20a. When the locking lever 28 is in the state shown in FIGS. 1 and 11, a spring 28e urges the locking lever 28 in a pivotal manner in a direction opposite to the direction indicated by arrow F. As shown in FIG. 1, the shaft 28a is held in a substantially U-shaped holder 28d. If the locking lever 28 is further pivoted in the direction of arrow F from the state of FIGS. 1 and 11, the other end 28c abuts against an abutment surface 31b of a proximal holder 31a of a locking bar 31, which will be described later, as shown in FIG. 12. The shaft 28a and the end 28b move further upward against the force of the spring 28e, using the abutting portion as a fulcrum, and are separated from the holder 28d. In this case, when the shaft 28a is in the state of FIG. 12, the spring 28e urges the other end 28c downward (in the direction indicated by arrow F') and presses the end 28c against the abutment surface 31b of the proximal holder 31a, which is provided in the locking bar 31 shown in FIG. 22.

The lever 17, the slidable piece 20a, and the operating plate 29 constitute a cooperative unlocking mechanism 30.

Figure 11:
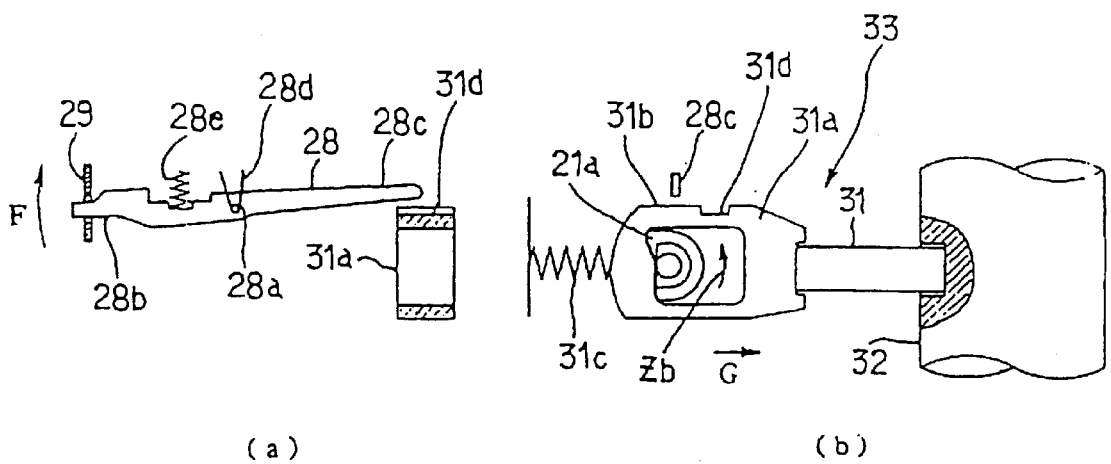
FIG. 11 is a schematic view illustrating the operation of a steering shaft locking means.
Figure 12:
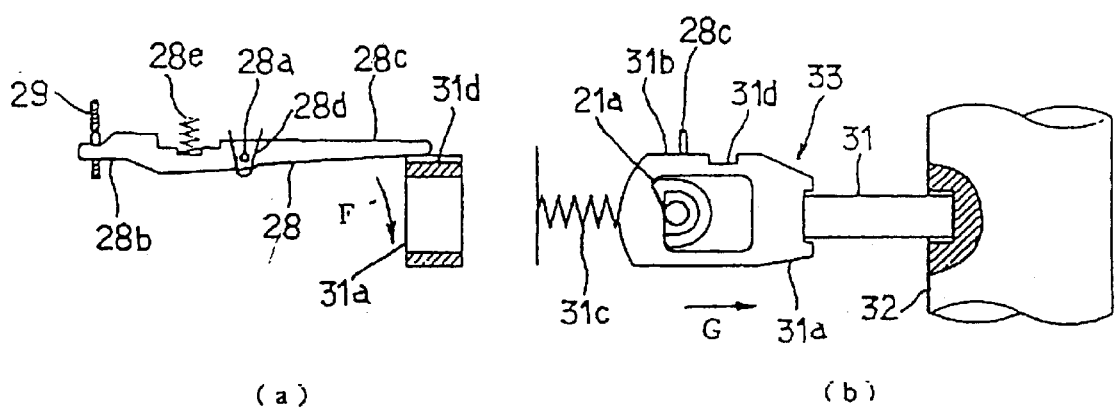
FIG. 12 is a schematic view illustrating the operation of the steering shaft locking means.

As shown in FIGS. 11 and 22, the locking bar 31 locks or unlocks a steering shaft 32. The proximal holder 31a is located at a proximal end of the locking bar 31 and has a spring 31c and an engaging groove 31d. The spring 31c normally urges the locking bar 31 in a locking direction (direction indicated by arrow G). When the camshaft 21 is rotated to the "ACC" position (in the direction indicated by arrow Za in FIG. 3 or in the direction indicated by arrow Zb in FIG. 11), the cam 21a moves the locking bar 31 in the direction opposite to the direction of arrow G.

The locking lever 28, the locking bar 31, and the spring 31c form a steering shaft locking means 33. FIGS. 11 to 15 illustrate the operation of the steering shaft locking means 33. In each of these views, part (a) shows a schematic side view of the steering shaft locking means 33, while part (b) shows a schematic front view of the steering shaft locking means 33.

The solenoid 34 is provided in the main mechanism case 19. As shown in FIG. 16, a plunger 34a of the solenoid 34 is in a projected state when the solenoid 34 is not excited. When the solenoid 34 is excited, the plunger 34a is retracted. The solenoid 34 drives the pin 36, which is normally urged by a spring 35 in the direction indicated by arrow H. When the solenoid 34 is excited, the pin 36 is retracted in the direction of arrow H.

Figure 24:
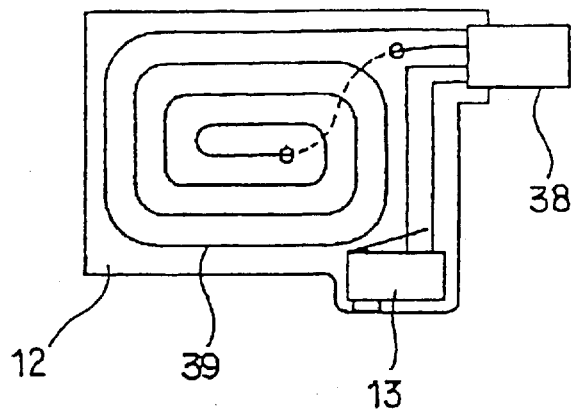
FIG. 24 is a plan view showing an upper circuit board.

The IC card 6 stores an ID code. Another circuit board 37 is provided below the circuit board 12. The upper circuit board 12 and the lower circuit board 27 are connected electrically by a harness 38. As shown in FIG. 24, the circuit board 12 has a pattern antenna 39. A signal received or sent by the antenna 39 and a detection signal from the card sensor switch 13 are sent to a microcomputer (not shown) of the circuit board 37. The solenoid 34 is controlled by the circuit of the circuit board 37. The pattern antenna, the microcomputer, and the circuit of the circuit board 37 form an IC card reader for reading the ID code stored in the IC card 6.

The operation of the above device will now be described. In the state shown in FIGS. 1 and 5, the IC card 6 is inserted through the card slot 4b of the card case 4a and the entrance 7d of the inner case 7. The IC card 6 lifts the rollers 9 such that the shutter 8 pivots upward about the shaft 10a shown in FIG. 6. The upward movement of the shutter 8 pivots the lever 17 in the direction indicated by arrow E of FIG. 4. A distal end 17b of the lever 17 slides the slidable piece 20a in the direction indicated by arrow D. This moves the slidable piece 20a in the same direction, and pivots the locking lever 28 in the direction indicated by arrow F as shown in FIGS. 1 and 11. In this manner, the end 28c of the locking lever 28 abuts against the proximal holder 31a of the locking bar 31, as shown in FIG. 12 (if the locking bar 31 moves in the direction opposed to the direction of arrow G, the end 28c engages the engaging groove 31d).

Figure 7:
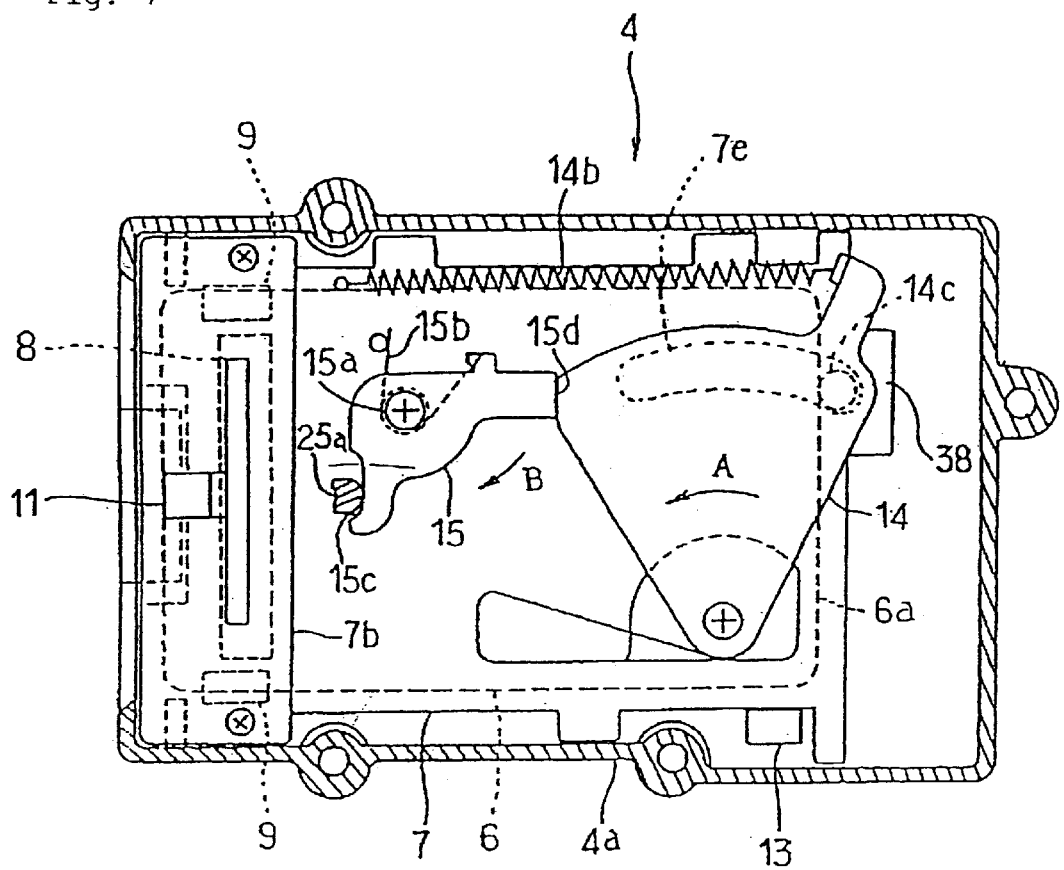
FIG. 7 is a horizontal cross-sectional plan view showing the card receiving portion in which a card is inserted.
Figure 8:
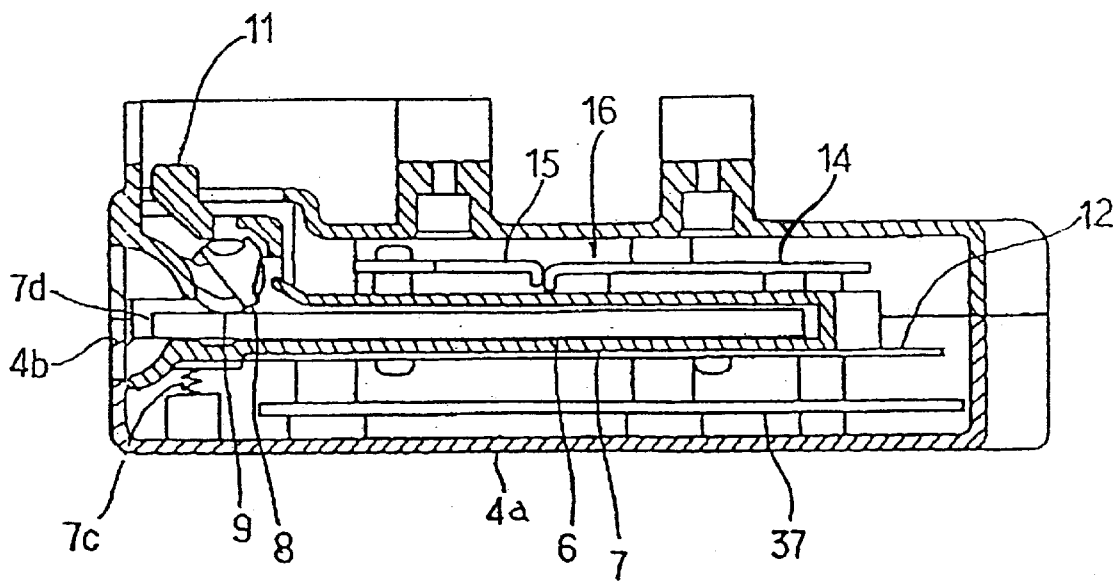
FIG. 8 is a vertical cross-sectional side view showing the card receiving portion in the same state as FIG. 7.
Figure 9:
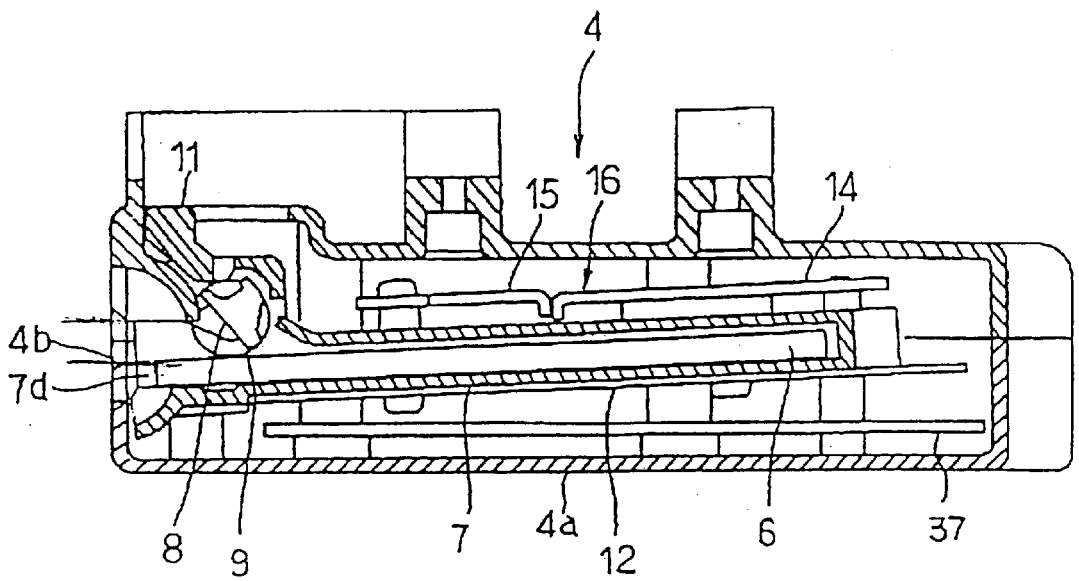
FIG. 9 is a vertical cross-sectional side view showing an inner case in an inclined state.
Figure 10:
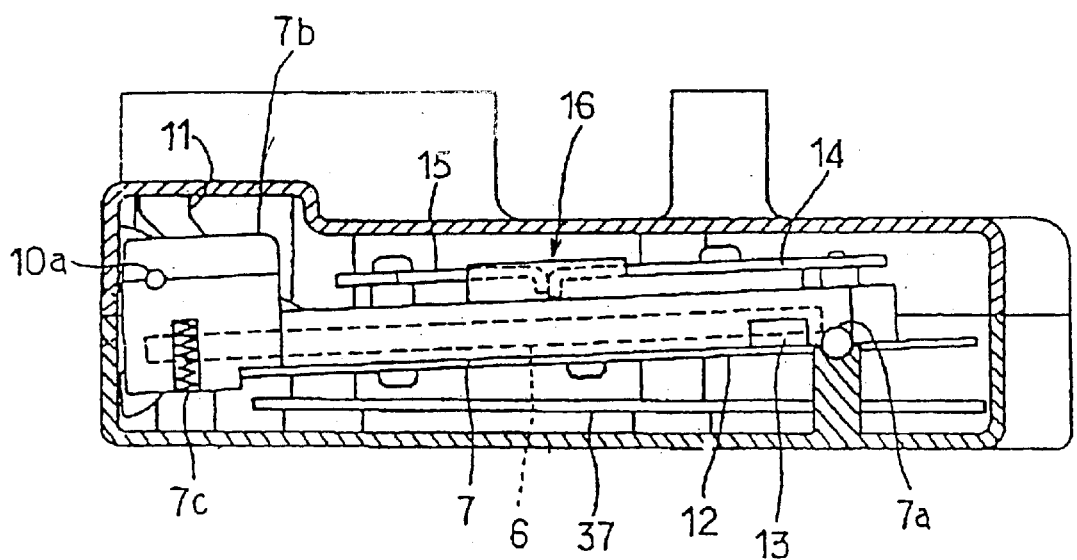
FIG. 10 is a vertical cross-sectional view taken at a position differing from FIG. 9 in the same state as FIG. 9.

If the IC card 6 is further inserted, as shown in FIG. 7, a rear end 6a of the IC card 6 presses the operated pin 14c of the ejector plate 14. This pivots the ejector plate 14 in the direction opposite the direction of arrow A. When the IC card 6 reaches an end position, the ejector plate 14 engages the stopper plate 15, thus preventing the ejector plate 14 from pivoting (returning) in the direction indicated by arrow A.

Figure 18:
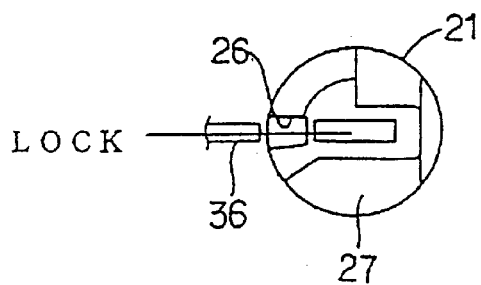
FIG. 18 is a schematic front view showing the relationship between the movement of the pin and the position of the camshaft.
Figure 19:
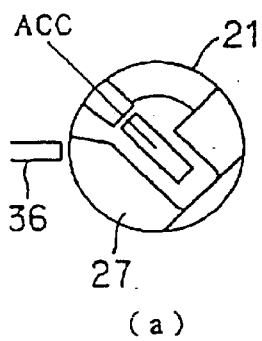
FIG. 19 is a schematic front view showing the relationship between the movement of the pin and the position of the camshaft.
Figure 19:
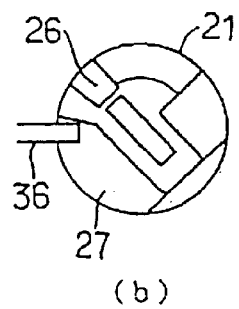
Figure 20:
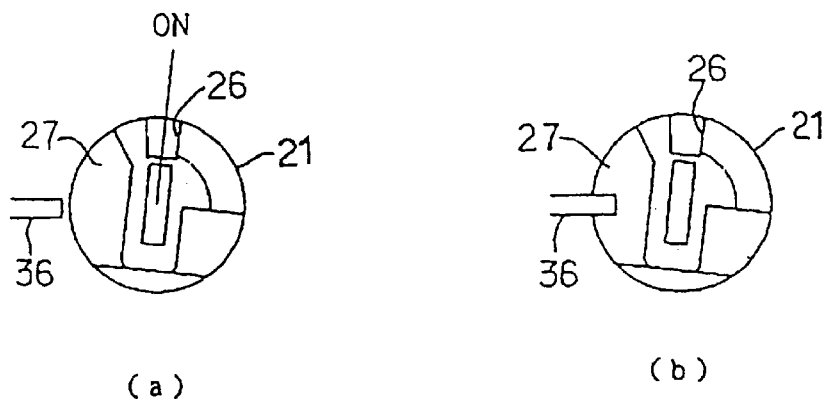
FIG. 20 is a schematic front view showing the relationship between the movement of the pin and the position of the camshaft.

The insertion of the IC card 6 activates the card sensor switch 13 causing detection of the insertion. The card sensor switch 13 sends an activation signal to the IC card reader. The IC card reader communicates with the IC card 6 and reads out the ID code. If the ID code matches the registered code and the gear lever (not shown) is located in "P" range, the solenoid 34 is excited. This retracts the pin 36 from the engaging recess 26, as shown in FIG. 18. In this manner, the knob 23 is permitted to rotate.

Figure 13:
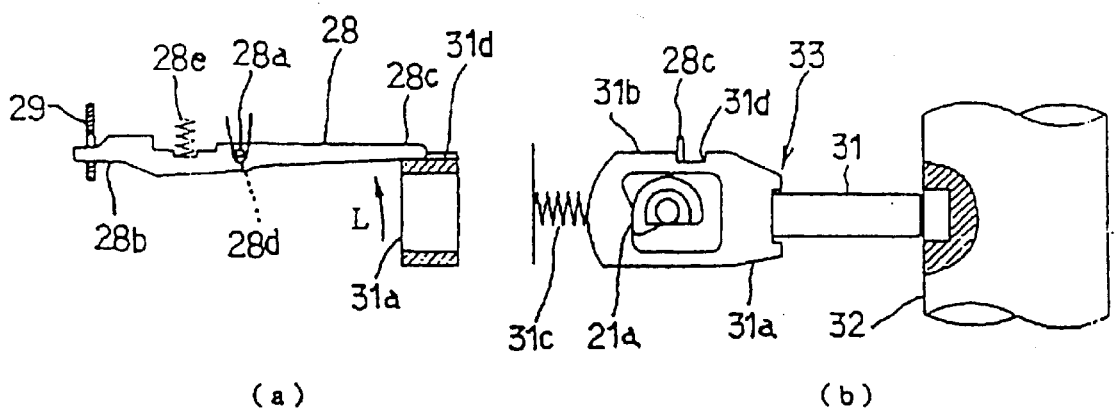
FIG. 13 is a schematic view illustrating the operation of the steering shaft locking means.

Afterward, if the knob 23 is rotated to the "ACC" position, the rotor 20 and the camshaft 21 are rotated to the state shown in FIG. 19(a) (with the pin 36 opposed to the releasing recess 27 while being maintained in its retracted state). Accordingly, the locking bar 31 is moved in the direction opposite to the direction of arrow G, as shown in FIG. 13, to unlock the steering shaft 32. In this state, the end 28c of the locking lever 28 engages the engaging groove 31d formed in the proximal holder 31a of the locking bar 31. This stops movement of the locking bar 31 and prevents the steering shaft 32 from being locked.

Furthermore, when the knob 23 rotates, the cam 23a rotates integrally with the knob 23, thus pressing the push-down lever 11. Thus, the entrance 7d of the inner case 7 is slightly inclined downward. The IC card 6 is thus prevented from being released from the inner case 7.

Figure 21:
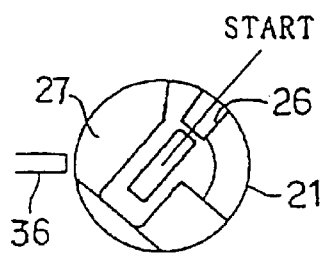
FIG. 21 is a schematic front view showing the relationship between the movement of the pin and the position of the camshaft.

If the knob 23 is further rotated from the "ON" position to the "START" position, the camshaft 21 is rotated from the state of FIG. 20(a) to the state of FIG. 21. In this state, the pin 36 is relatively opposed to the accommodating recess 27 while being maintained in its retracted state. Since the knob 23 is located in the "START" position, the engine is started. Subsequently, the knob 23 is returned to the "ON" position. In this state, if the gear lever is shifted to the "D" range, the "L" range, the "2" range or the "R" range (ranges other than the "P" range), the solenoid 34 is de-excited. The pin 36 thus projects into the accommodating recess 27, as shown in FIG. 20(b). The solenoid 34 is also de-excited when the shift lever is shifted to a range other than the "P" range while the knob 23 is located in the "ACC" position. The pin 36 thus projects into the accommodating recess 27, as shown in FIG. 19(b). In other words, the knob 23 is not permitted to rotate to the "LOCK" position if the gear lever is shifted to a range other than the "P" range.

However, if the gear lever is shifted to the "P" range, the solenoid 34 is excited, thus permitting the knob 23 to rotate to the "LOCK" position.

If the knob 23 is rotated to the "LOCK" position, the cam 23a rotates to lift the push-down lever 11, thus allowing the spring 7c to return the inner case 7 to a horizontal state. As a result, the entrance 7d of the inner case 7 opposes the card slot 4b.

If the knob 23 is pressed in the direction indicated by arrow C (see FIG. 1) while being located at the "LOCK" position, the ejector lever 25 moves in the same direction as the knob 23. The ejector lever 25 thus presses the end 15c of the stopper plate 15 in the direction of arrow C, as shown in FIG. 7. Accordingly, the stopper plate 15 pivots in a direction opposite the direction indicated by arrow B, thus separating the other end 15d of the stopper plate 15 from the ejector plate 14. As a result, the ejector plate 14 pivots in the direction indicated by arrow A. The operated pin 14c thus ejects the IC card 6 from the inner case 7 (i.e., a portion of the IC card 6 extends from the card slot 4b of the card case 4a). While the IC card 6 is in this state, the locking bar 31 is in the state shown in FIG. 13.

Figure 14:
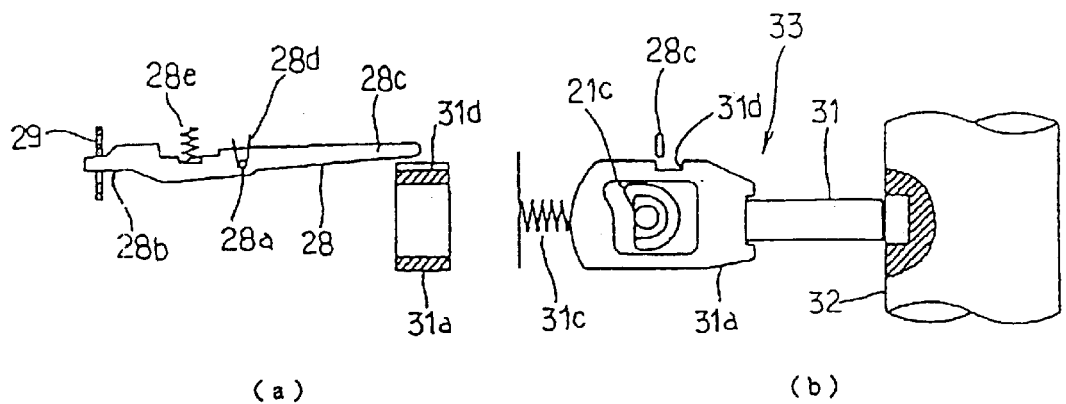
FIG. 14 is a schematic view illustrating the operation of the steering shaft locking means.
Figure 15:
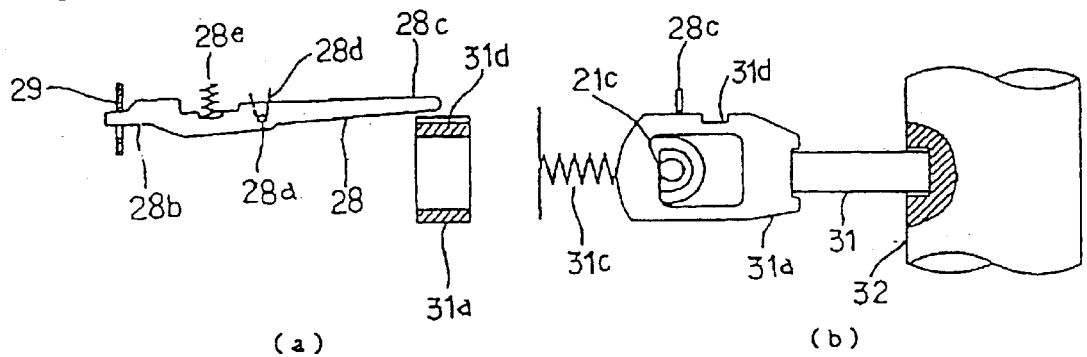
FIG. 15 is a schematic view illustrating the operation of the steering shaft locking means.

Afterward, when the IC card 6 is removed from the card receiving portion 4, the rollers 9 and the shutter 8 pivot downward, thus lowering the lever 17. This pivots the locking lever 28 in a direction opposite to the direction indicated by arrow F. Thus, the end 28c of the locking lever 28 is moved in the direction indicated by arrow L from the state of FIG. 13, and the end 28c is disengaged from the engaging groove 31d (FIG. 14 shows the end 28c immediately after disengaging from the groove 31d). As a result, the locking bar 31 is engaged with the steering shaft 32 by the force of the spring (as shown in FIG. 15). In this manner, the steering shaft 32 is locked.

In the above embodiment, it is determined whether the ID code stored in the IC card 6 matches the registered code. The judgement result is used as a condition for permitting engine starting. This improves vehicle security. Furthermore, the knob 23 of the main mechanism 5 is operable between the position at which the vehicle is not permitted to be driven and the positions at which the vehicle is permitted to be driven including the engine starting position. This structure does not require a conventional key. In addition, the main mechanism 5 is provided with the steering shaft locking means 33 for locking the steering shaft 32 when the knob 23 is located at the position at which the vehicle is not permitted to be driven ("LOCK" position). The vehicle starting device of the present invention thus selectively locks and unlocks the steering shaft 32. The starting device also has the card receiving portion 4 connected integrally with the main mechanism 5. The device is thus relatively easily assembled, and the arrangement of the design is simplified.

Since the card receiving portion 4 and the main mechanism 5 are coupled integrally, various types of mechanical control devices may be provided between the card receiving portion 4 and the main mechanism 5. Particularly, in the above embodiment, the card receiving portion 4 includes operating members operated by the insertion of the IC card 6 such as the shutter 8 and the rollers 9. The cooperative unlocking mechanism 30 located between the card receiving portion 4 and the main mechanism 5 cooperates with the shutter 8 and the rollers 9 to unlock the steering shaft locking means 33. Thus, the insertion of the IC card 6 into the card receiving portion 4 mechanically unlocks the steering shafted 32.

Furthermore, in the above embodiment, the inner case 7 of the card receiving portion 4, in which the inserted IC card 6 is accommodated, is movable relative to the slot 4b of the card receiving portion 4. The card release prevention mechanism 24, which is located between the card receiving portion 4 and the main mechanism 5, cooperates with the knob 23 to move the inner case 7 relative to the card slot 4b. Thus, the IC card 6 is prevented from being released from the inner case 7 in relation with the operation of the knob 23.

In addition, in the above embodiment, the card receiving portion 4 includes the release mechanism 16 for releasing the IC card 6 from the inner case 7. The card release control mechanism, or the ejector lever 25, which is located between the card receiving portion 4 and the main mechanism 5 cooperates with the knob 23 to actuate the release mechanism 16. The IC card 6 is thus released from the inner case 7 in relation with the operation of the knob 23.

Figure 25:
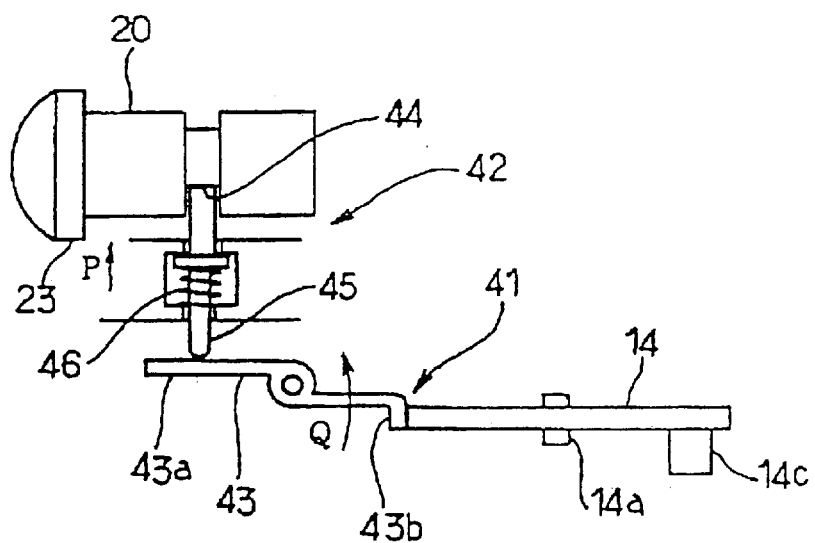
FIG. 25 is a schematic side view showing a release mechanism and a release control mechanism according to a second embodiment of the present invention.

FIGS. 25 to 28 schematically show a second embodiment according to the present invention. The second embodiment has a release mechanism 41 and a release control mechanism 42 that differ slightly from those of the first embodiment. The release mechanism 41 has an ejector plate 14 and a stopper lever 43. As shown in FIG. 25, the stopper lever 43 has one end 43a pivoting upward and downward and the other end 43b engaged with the ejector plate 14. The stopper lever 43 is normally urged by a spring (not shown) in a direction opposite to the direction indicated by arrow Q.

The release control mechanism 42 has a cam 44 formed in the rotor 20 and a pin 45 moved vertically by the cam 44. The pin 45 is normally urged by a spring 46 in the direction indicated by arrow P. The knob 23 is rotatable counterclockwise from a "LOCK" position to an "EJECT" position.

Figure 26:
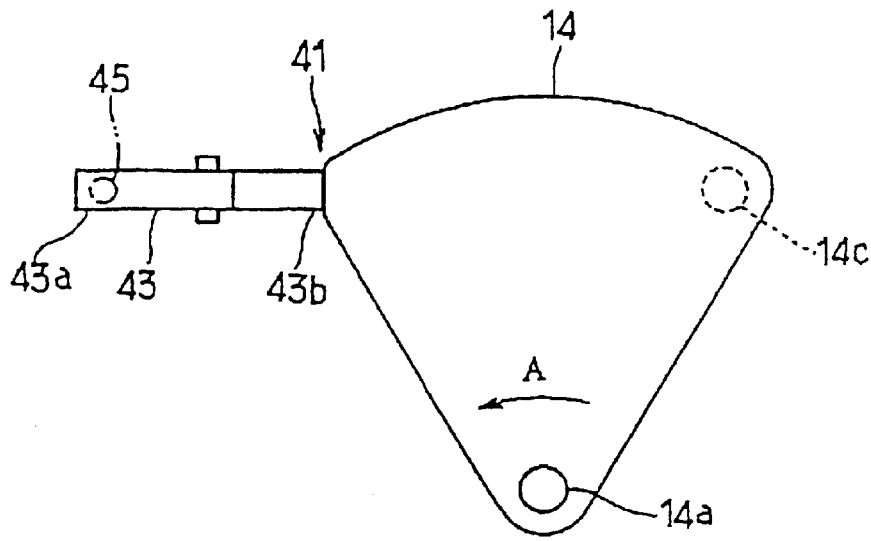
FIG. 26 is a plan view.
Figure 27:
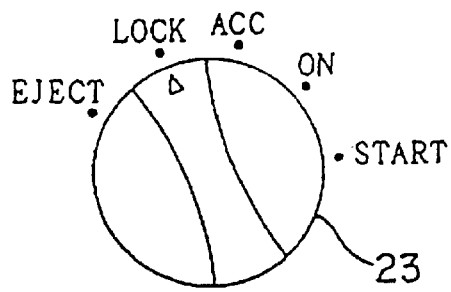
FIG. 27 is a front view showing a knob.
Figure 28:
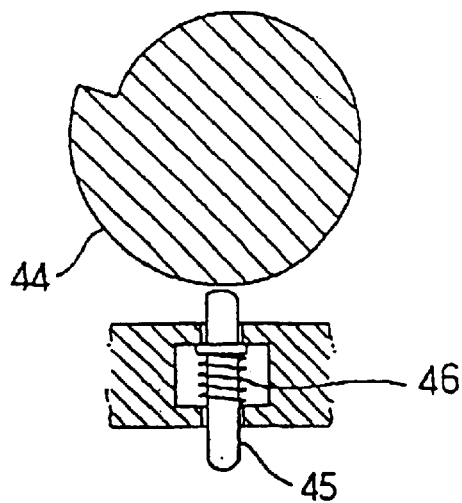
FIG. 28 is a vertical cross-sectional front view showing a cam.

FIGS. 25 and 26 each show the release mechanism 41 and the release control mechanism 42 with the IC card 6 inserted in the inner case 7. If the knob 23 is rotated to the "EJECT" position in this state, the pin 45 moves downward to pivot the stopper lever 43 in the direction indicated by arrow Q. This disengages the engaging end 43b of the stopper lever 43 from the ejector plate 14 and allows the ejector plate 14 to pivot in the direction indicated by arrow A, which releases the IC card 6.

The second embodiment has the same advantages as the first embodiment.

Figure 29:
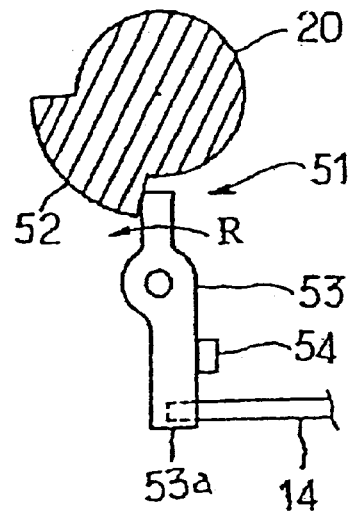
FIG. 29 is a vertical cross-sectional front side view schematically showing a release mechanism and a release control mechanism according to a third embodiment of the present invention.
Figure 30:
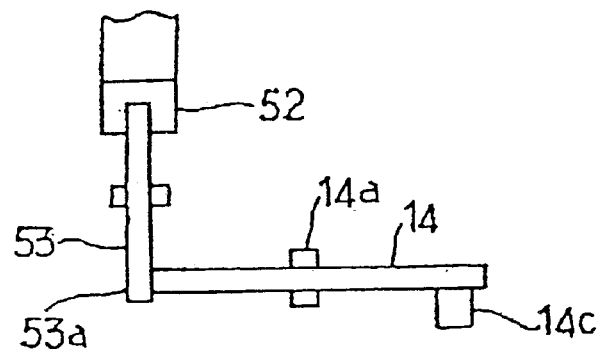
FIG. 30 is a side view.
Figure 31:
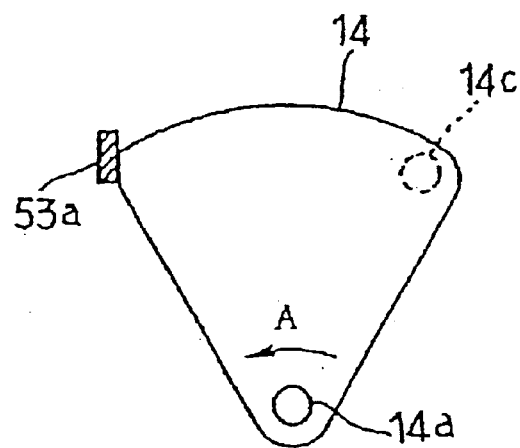
FIG. 31 is a horizontal cross-sectional plan view.

FIGS. 29 to 31 show another embodiment according to the present invention. This embodiment differs from the second embodiment in that a release mechanism is formed by the ejector plate 14, and a card release control mechanism 51 is formed by a cam 52 of a rotor 20 and a stopper lever 53. The stopper lever 53 is urged by a spring (not shown) in the direction indicated by arrow R. A stopper 54 restricts pivoting of the stopper lever 53.

If the knob 23 is rotated to the "EJECT" position when the stopper lever 53 is in the state of FIGS. 29 to 31, the stopper lever 53 pivots in a direction opposite to the direction indicated by arrow R. An end 53a of the stopper lever 53 thus disengages from the ejector lever 14 and pivots the ejector plate 14 in the direction indicated by arrow A to release the IC card 6. This embodiment also has the same advantages as the first embodiment.

Figure 32:
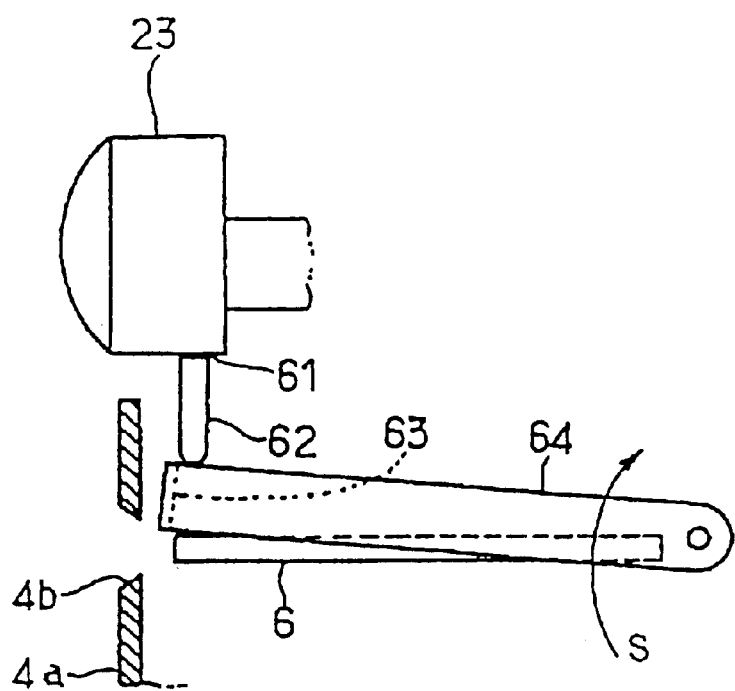
FIG. 32 is a vertical cross-sectional front view schematically showing a card release prevention mechanism according to a fourth embodiment of the present invention.
Figure 33:
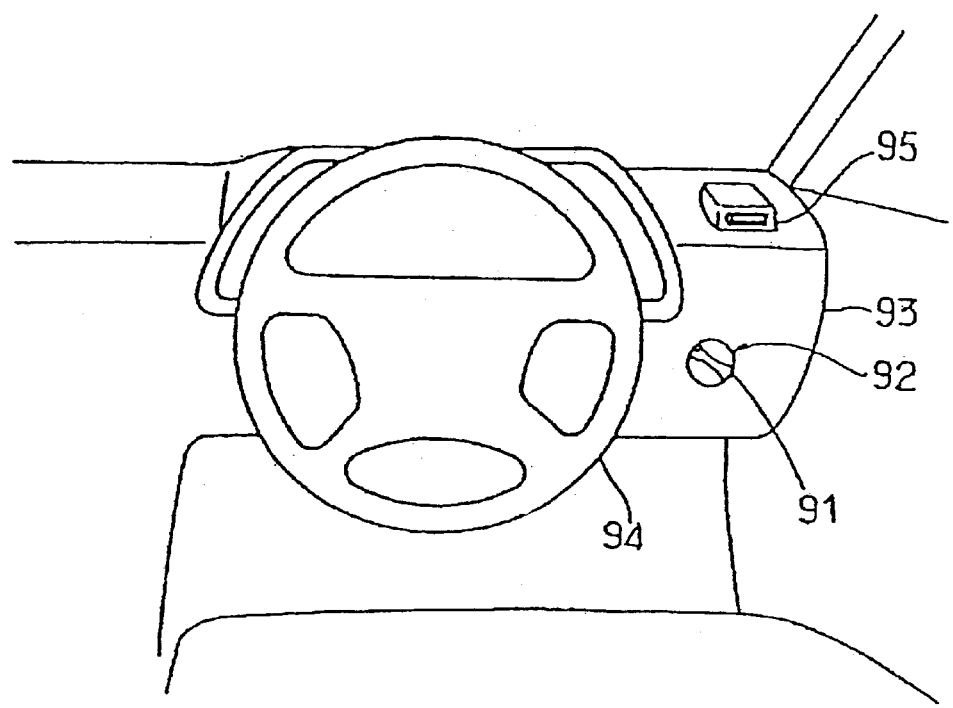
FIG. 33 is a view corresponding to FIG. 2 showing a prior art example.

FIG. 32 shows a fourth embodiment according to the present invention having a card release prevention structure differing from the first embodiment. The knob 23 includes a cam 61 having a lever 62 that moves vertically. The lever 62 is connected to an arm 64 that pivots a cover 63, which opens and closes the card slot 4b of the card case 4a. The arm 64 is urged by a spring (not shown) in the direction indicated by arrow S. When the knob 23 is rotated, the lever 62 moves downward causing the cover 63 to close the card slot 4b and prevent the IC card 6 from being released. In this structure, the IC card 6 is also prevented from being released from the inner case 7 in relation with the operation of the knob 23.

It is apparent from the above description that the present invention has the advantages described below In the invention, it is determined whether an ID code in an IC card matches a code registered in a vehicle. The determination result is used as one of the conditions for permitting starting of the engine. This improves the vehicle security. Furthermore, the main mechanism has an operating means operable between a driving prohibiting position and a driving permitting position, which includes an engine starting position. Thus, a conventional key is not required. The main mechanism also has the steering shaft locking means for locking the steering shaft in a rotation prohibition state when the operating means is located at the vehicle operation prohibiting position. This permits rotation of the steering shaft to be prohibited and permitted. In addition, the card receiving portion and the main mechanism are integrally connected with each other. Thus, assembly is relatively easy and the arrangement is simple.

Furthermore, since the card receiving portion and the main mechanism are formed integrally, various types of mechanical control mechanisms may be provided between the card receiving portion and the main mechanism. Particularly, a movable member that moves in accordance with the insertion of the IC card is arranged in the card receiving portion, and a cooperative unlocking mechanism cooperating with the movable member for cancelling the locking of the steering shaft locking means is located between the card receiving portion and the main mechanism. Thus, the steering shaft is unlocked mechanically when the IC card is inserted.

The invention improves vehicle security and does not require a conventional key. Further, rotation of the steering shaft can be prohibited and permitted. In addition, the card receiving portion and the main mechanism are integrally connected with each other. Thus, assembly is relatively easy and the arrangement is simple.

Furthermore, since the card receiving portion and the main mechanism are integral, various types of mechanical control mechanisms may be provided between the card receiving portion and the main mechanism. An inner case is arranged in the card receiving portion to receive the inserted IC card. The inner case is movable relative to a card slot of the card receiving portion. This prevents the IC card from being released from the card receiving portion in accordance with the operation of the operating member.

The invention improves vehicle security and does not require a conventional key. Further, rotation of the steering shaft can be prohibited and permitted. In addition, the card receiving portion and the main mechanism are integrally connected with each other. Thus, assembly is relatively easy and the arrangement design is simple.

Furthermore, since the card receiving portion and the main mechanism are formed integrally, various types of mechanical control mechanisms may be provided between the card receiving portion and the main mechanism. A card release mechanism is arranged in the card receiving portion for releasing the inserted card from the card receiving portion. A card release control mechanism, which is located between the card receiving portion and the main mechanism, cooperates with the operating member to drive the card release mechanism. Thus, the IC card can be released in relation with the operation of the operating member.

We claim:

1. A vehicle starting device for determining whether an identification code stored in an integrated circuit (IC) card matches a code registered in a vehicle, wherein the determination result is used as one of the conditions for permitting starting of an engine, the device comprising:

a card receiving portion for receiving the IC card; and a main mechanism having an operating means operable between a driving prohibiting position and a driving permitting position, which includes an engine starting position, and a steering shaft locking means for locking a steering shaft in a rotation prohibition state when the operating means is located at the driving prohibiting position, the device being characterized in that:

the card receiving portion and the main mechanism are integrally connected with each other;

a moveable member that moves in accordance with the insertion of the IC card is arranged in the card receiving portion; and a cooperative unlocking mechanism cooperating with the movable member for cancelling the locking of the steering shaft locking means is located between the movable member and the steering shaft locking means.

2. A vehicle starting device for determining whether an identification code stored in an integrated circuit (IC) card matches a code registered in a vehicle, wherein the determination result is used as a condition for permitting starting of an engine, the device comprising:

a card receiving portion for receiving the IC card; and a main mechanism having an operating means operable between a driving prohibiting position and a driving permitting position, which includes an engine starting position, and a steering shaft locking means for locking a steering shaft in a rotation prohibition state when the operating means is located at the driving prohibiting position, the device being characterized in that:

the card receiving portion and the main mechanism are integrally connected with each other;

an inner case is arranged in the card receiving portion to receive the inserted IC card, the inner case being movable relative to a card slot of the card receiving portion;

a movable member that moves in accordance with the insertion of the IC card is provided in the card receiving portion; and a cooperative unlocking mechanism, which is located between the movable member and the steering shaft locking means, cooperates with the movable member for canceling the locking of the steering shaft locking means.

3. A vehicle starting device for determining whether an identification code stored in an integrated circuit (IC) card matches a code registered in a vehicle, wherein the determination result is used as one of the conditions for permitting starting of an engine, the device comprising:

a card receiving portion for receiving the IC card; and a main mechanism having an operating means operable between a driving prohibiting position and a driving permitting position, which includes an engine starting position, and a steering shaft locking means for locking a steering shaft in a rotation prohibition state when the operating means is located at the driving prohibiting position, the device being characterized in that:

the card receiving portion and the main mechanism are integrally connected with each other;

a card release mechanism is arranged in the card receiving portion for releasing the inserted card from the card receiving portion; and a card release control mechanism, which is located between the card receiving portion and the main mechanism, cooperates with the operating means to drive the card release mechanism.

* * * * *